(12) United States Patent
Charpentier et al.

(10) Patent No.: US 6,337,986 B1
(45) Date of Patent: *Jan. 8, 2002

(54) SYSTEM FOR IDENTIFYING A CALLED TERMINAL AMONGST A PLURALITY OF USER TERMINALS CONNECTED TO A TELEPHONE SWITCH, THE TELEPHONE SWITCH BEING CONNECTED TO AT LEAST ONE FIXED RADIOTELEPHONE TERMINAL

(75) Inventors: Jean Charpentier, Viroflay; Edouard Issenmann, Le Chesnay, both of (FR)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/236,066

(22) Filed: Jan. 25, 1999

(30) Foreign Application Priority Data

Jan. 26, 1998 (FR) ............................................. 98 00768
Apr. 30, 1998 (FR) ............................................. 98 05543

(51) Int. Cl.⁷ .................................................. H04Q 7/20
(52) U.S. Cl. ........................................ 455/445; 455/426
(58) Field of Search ................................. 455/445, 426, 455/417, 465, 554

(56) References Cited

U.S. PATENT DOCUMENTS

| 5,544,227 A | 8/1996 | Blust et al. |
| 5,596,624 A | 1/1997 | Armbruster et al. |
| 6,064,891 A | * 5/2000 | Aucoeur ..................... 455/426 |

FOREIGN PATENT DOCUMENTS

| WO | WO 95/29565 | 11/1995 |
| WO | WO 96/24225 | 8/1996 |

* cited by examiner

*Primary Examiner*—Marsha D. Banks-Harold
(74) *Attorney, Agent, or Firm*—Sughrue Mion, PLLC

(57) ABSTRACT

A system that forwards a call addressed to one of a plurality of user terminals and contains a directory number of the called user terminal to a mobile service switching center giving access to the called user terminal. The system sends to the mobile service switching center an IAM message containing the directory number of the called user terminal. The mobile service switching center supplies the directory number to a radiotelephone terminal as a SETUP message. The fixed radiotelephone terminal extracts the directory number of the called user terminal from the SETUP message received for setting up each call, and sends said number to the switch in the form of a conventional signaling message.

3 Claims, 2 Drawing Sheets

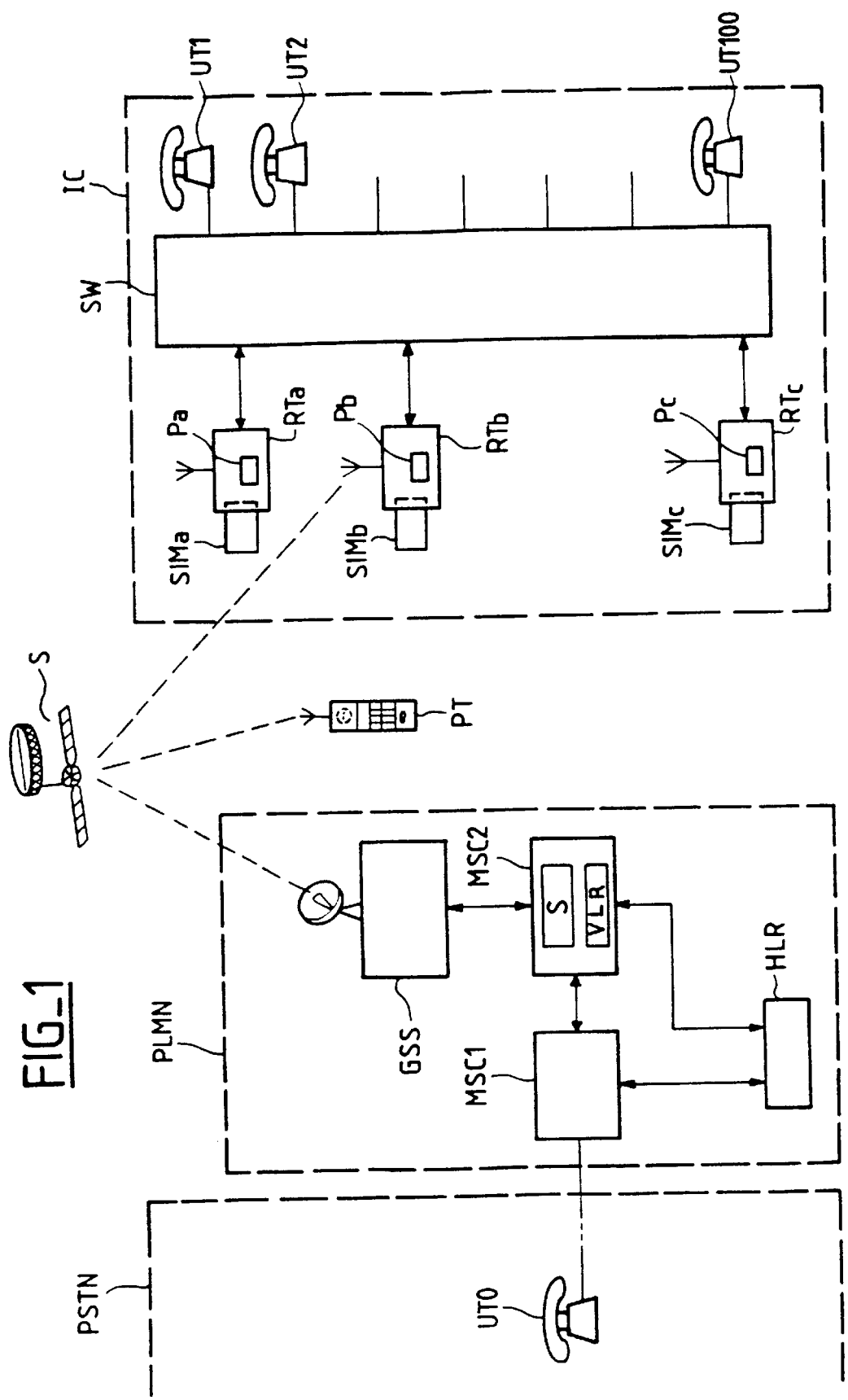

FIG_2

| MESSAGE | PARAMETRES | PSTN | MSC1 | HLR | MSC2 | UT1 |
|---|---|---|---|---|---|---|
| IAM | Called=MSISDN1 | 51 → | | | | |
| SRI invoke | Called=MSISDN1 | | 52 → | | | |
| SRI result | Forward-to nbr=MSISDNa | | ← 53 | | | |
| IAM | Called=MSISDNa<br>Original called=MSISDN1 | | 54 ↩ | | | |
| SRI invoke | Called=MSISDNa | | 55 → | | | |
| PRN invoke | Called=MSISDNa | | | 56 → | | |
| PRN result | MSRN=MSRNa | | | ← 57 | | |
| SRI result | MSRN=MSRNa | | ← 58 | | | |
| IAM | Called=MSRNa<br>Original called=MSISDN1 | | 59 → | | | |
| | | | | | 60<br>(RT busy forward to IMSIb) | |
| | | | | | 61<br>(RT busy forward to IMSIc) | |
| PAGING | | | | | 62 → | |
| AUTHENTI. | | | | | 63 → | |
| SETUP | Called party=MSISDN1 | | | | 64 → | |

SYSTEM FOR IDENTIFYING A CALLED TERMINAL AMONGST A PLURALITY OF USER TERMINALS CONNECTED TO A TELEPHONE SWITCH, THE TELEPHONE SWITCH BEING CONNECTED TO AT LEAST ONE FIXED RADIOTELEPHONE TERMINAL

The invention relates to a system for identifying a called terminal amongst a plurality of user terminals connected to a telephone switch which is connected to a conventional telephone network by at least one fixed radiotelephone terminal serving to replace a cable link. Each fixed radiotelephone terminal performs functions analogous to those of a conventional portable ratio-telephone terminal, however it serves to connect the telephone network to the switch or exchange rather than to a single user.

BACKGROUND OF THE INVENTION

By way of example, the switch is a small switch serving a hotel or a village situated in an isolated region where it would be too expensive to lay a cable. The switch serves a group of fixed user terminals by routing calls coming from the public network. Each fixed radiotelephone terminal is used in succession with different user terminals since the user terminals are not in permanent use. A plurality of radiotelephone terminals can share a common frequency band by using time division or code division.

The invention relates more particularly to radiotelephone networks of the GSM type, and to those of types derived from the GSM type and which include a stationary satellite, or satellites in low earth orbit (LEO). GSM type networks have the following characteristics:

a geographical zone subdivided into cells so as to enable carrier frequencies to be reused;
  a gateway that manages the resources of each cell concerning carrier frequencies and a plurality of channels carried by each carrier frequency; and
  at least one switching center of the mobile radio service that manages: calls, connections with the fixed telephone network, and databases, wherein the databases contain the directory number, the international mobile subscriber number, and the location of each mobile subscriber.

Conventional GSM networks or networks derived therefrom are not designed to enable a plurality of subscribers to use the same user terminal. The user personalizes the terminal being used by inserting a subscriber identification module (SIM) card therein containing the international mobile subscriber identity (IMSI) which determines the account to which calls will be billed. After an initialization stage, the terminal is specified in radio messages by a temporary mobile subscriber identity (TMSI) which serves to protect the user's anonymity. In addition, an authentication procedure uses a secret key contained in the SIM card to prevent a user making fraudulent use of the IMSI or the TMSI of another user, whenever a call is made or received.

The use of a plurality of fixed radiotelephone terminals to connect a single switch to a GSM network raises the problem of supplying the switch with the identity of the called line.

OBJECT AND SUMMARY OF THE INVENTION

The object of the invention is to propose a simple system for solving this problem.

The invention provides a system for identifying a called terminal amongst a plurality of user terminals connected to a telephone switch, said telephone switch being connected to at least one fixed radiotelephone terminal, each fixed radiotelephone terminal including means for communicating wit a fixed telephone network; the system including call forwarding means for forwarding a call addressed to one of the user terminals and containing the directory number of the called user terminal to a mobile service switching center giving access to the called user terminal, wherein:

the call forwarding means for forwarding a call addressed to one of the user terminals includes means for sending to the mobile service switching center an IAM message containing the directory number of the called user terminal;
  wherein the mobile service switching center further includes means for supplying the directory number to a fixed radiotelephone terminal in a SETUP message; and
  wherein each of said fixed radiotelephone terminals includes means for extracting the directory number of the called user terminal from the SETUP message received for setting up each call, and for sending said number to the switch in the form of a conventional signalling message.

The system characterized in this way makes it possible in simple manner to perform direct inward dialing, and the switch can behave like a switch connected to a fixed network in order to perform direct inward dialing.

BRIEF DESCRIPTION OF THE DRAWINGS

The invention will be better understood and other characteristics will appear on reading the following description and from the accompanying figures:

FIG. 1 is a block diagram of an example of a telecommunications network including the system of the invention; and FIG. 2 is a timing diagram illustrating the operation of the network shown in FIG. 1, using the system of the invention to identity the call user terminal.

MORE DETAILED DESCRIPTION

FIG. 1 is a block diagram of an example of a public telecommunications network including the system of the invention for providing telephone service to a community IC situated in an isolated region. This isolated community IC is served by a small private exchange or switch SW to which one hundred conventional telephone terminals UT1, . . . , UT100 are connected, for example. The switch SW is connected to a national public switched telephone network (PSTN) via a pubic land mobile network (PLMN) of a type derived from the GSM type.

The PLMN includes a geostationary satellite or a plurality of LEO satellites, and its main function is to serve mobile radiotelephone terminals PT. A switching center for the mobile radio service, MSC2, is connected to a satellite S via a gateway subsystem GSS which maintains a radio link with the satellite S. The PLMN includes in particular two switching centers for the mobile radio service, MSC1 and MSC2, and a database known as the HLR.

The switch SW communicates with the satellite S by means of three fixed radiotelephone terminals RTa, RTb, and RTc. Each fixed radiotelephone terminal RTa, RTb, and RTc is connected by a conventional telephone cable to the switch SW and each includes a card reader in which there is inserted a respective SIM card SIM1, SIM2, or SIM3. Each fixed radiotelephone terminal RTa, RTb, and RTc has a respective processor Pa, Pb or Pc provided with a program which defines the operation of the terminal. It operates in identical manner to a conventional radiotelephone terminal of GSM or GSM-derivative type. A preferred embodiment consists in using a conventional radiotelephone terminal in a fixed manner.

All of the user terminals UT1, ..., UT100 correspond to respective subscriptions and benefit from unconditional call forwarding to the line which corresponds to radiotelephone terminal RTa which is the first in the list of radiotelephone terminals RTa, RTb, RTc that can be used for routing a call to the user terminals UT1, ..., UT100. If these subscriptions are of the "mobile subscriber" type, then each of the terminals UT1, ..., UT100 has its own IMSI (but no SIM card since that would be pointless for a subscriber who does not move). If the subscriptions are of the "fixed subscriber" type, then each of the terminals UT1, ..., UT100 has a conventional directory number.

The direct inward dialing (DID) function is performed using a method which requires modification to the software of the computer controlling the switching center MSC2 serving the radiotelephone terminals RTa, RTb, and RTc. When a call is set up, the center MSC2 sends a SETUP message which instead of containing the mobile station ISDN directory number (MSISDNa/b/c) of the fixed radiotelephone terminal RTa, RTb, or RTc, contains in accordance with the GSM standards:

either the MSISDN directory number of the called user terminal, if its subscription is of the "mobile subscriber" type;

or else its conventional directory number if its subscription is of the "fixed subscriber" type.

The terminal RTa, RTb, or RTc over which a call is routed forwards the directory number to the switch SW so as to enable it to select the user terminal which is being called. The software in each terminal RTa, RTb, and RTc is modified to extract the directory number of the called user terminal UT1, ..., UT100 from the SETUP message received for setting up each call; and it is also modified to send this number to the switch SW in the form of conventional signalling messages, so as to enable the switch to select the called user terminal.

FIG. 2 is a timing diagram showing the operation of the network shown in FIG. 1, using the system of the invention to identify the called user terminal. This operation consists in forwarding a call successively to each of the radiotelephone terminals RTa, RTb, and RTc in a predetermined list, until one is found that is available. In the example under consideration, the various steps performed are the following:

51) A user of the fixed PSTN picks up the handset of a terminal UT0 and dials the directory number of terminal UT1 situated in the isolated community IC. Since the directory number is a public land mobile network (PLMN) number the parent exchange (not shown) of the terminal UT0 sends an initial address message (IAM) to a switching center MSC1 of the mobile radio service requesting that a call be set up between the terminal UT1 and the terminal UT0, with the terminal UT1 being designated by its directory number MSISDN1. The center MSC1 acts merely as an access point to the PLMN for the terminal UT0.

52) The center MSC1 sends a send routing information (SRI) request to the home location register HLR of the PLMN.

53) The HLR replies to the center MSC1 with a message instructing it to route the call to radio-telephone terminal RTa, with the terminal being specified by its directory number MSISDNa.

54) The center MSC1 then forwards the call by sending itself an IAM requesting that a call be set up with radiotelephone terminal RTa, which it identifies by means of its directory number MSISDNa. The center also places the directory number MSISDN1 designating the called terminal UT1 in an "ORIGINAL CALLED NUMBER" field of the message so as to make direct inward dialing possible for the call in the switch SW.

55) The center MSC1 thus sends the HLR a message referenced "SRI invoke" requesting routing information.

56) The HLR then sends a message requesting a roaming number to the mobile service switching center MSC2 since that is the center serving the terminal whose directory number is MSISDNa.

57) The center MSC2 replies to the HLR with a message referenced "PRN result" containing a roaming number MSRNa corresponding to the directory number MSISDNa. This roaming number enables a telephone call to be set up with the terminal RTa.

58) The HLR sends a message referenced "SRI result" containing routing information constituted by the roaming number MSRNa.

59) The center MSC1 then sends an IAM requesting an initial address to the center MSC2, this message containing the roaming number MSRNa and the initially called number MSISDN1.

60) In this example, the center MSC2 observes that the terminal RTa designated by the roaming number MSRNa is busy. It forwards this call to the number IMSIb.

61) In this example, the center MSC2 observes that the terminal RTb designated by the number IMSIb is also busy. It forwards the call to number IMSIc.

62) In this example, the center MSC2 observes that the terminal RTc designated by the number IMSIc is free. It sends a paging message for terminal RTc.

63) The center MSC2 authenticates the terminal RTc.

64) the center MSC2 sends a SETUP message to the terminal RTc for use by the switch SW, this message containing the initially requested number MSISDN1. This number is used by the switch SW to set up a connection to the called terminal UT1.

The initially requested number is preferably placed in the "called party BCD number" field of the SETUP message, however it is possible to place it in any other field of the message.

If the subscriptions of the terminals UT1, ..., UT100 are of the "fixed subscriber" type and they depend from a local switch in the conventional PSTN, then the functions described above as being performed by the center MSC1 are performed by the local switching center of the conventional PSTN.

What is claimed is:

1. A system for identifying a called terminal amongst a plurality of user terminals connected to a telephone switch, said telephone switch being connected to at least one fixed radiotelephone terminal, each fixed radiotelephone terminal capable of communicating with a fixed telephone network, wherein:

the system includes a call forwarding apparatus which receives a call addressed to said called terminal and in response thereto sends to itself an initial address message requesting that a call be set up with one of said fixed radiotelephone terminals, and thereafter sends a further initial address message containing the directory number of the called user terminal to a mobile service switching center giving access to the called user terminal;

the mobile service switching center is responsive to said further initial address message to supply the directory number to a fixed radiotelephone terminal in a SETUP message; and each of said fixed radiotelephone terminals includes extraction apparatus which extracts said directory number from the SETUP message received for setting up each all, and sends said directory number to the switch in the form of a conventional signaling message.

2. The system according to claim 1, wherein said further initial address message sent by said forwarding apparatus requests setup of a call to one of said fixed radiotelephone terminals.

3. The system according to claim 1, wherein said forwarding apparatus is responsive to receipt of said initial address message from itself to send said further initial address message to said mobile service switching center.

* * * * *